United States Patent [19]

Scrémin et al.

[11] 4,207,934
[45] Jun. 17, 1980

[54] SYSTEM OF FASTENING AN APPARATUS ON A CARTRIDGE OF FLUID UNDER PRESSURE

[75] Inventors: Gérard Scrémin, Lyons; Nino Urbano, Oullins, both of France

[73] Assignee: Application des Gaz, Paris, France

[21] Appl. No.: 868,102

[22] Filed: Jan. 9, 1978

[30] Foreign Application Priority Data

Jan. 10, 1977 [FR] France .............................. 77 00956

[51] Int. Cl.² .......................... B65B 3/04; B65B 31/00
[52] U.S. Cl. ...................................... 141/383; 141/20; 141/347; 285/208; 285/319
[58] Field of Search ................... 141/2, 3, 20, 21, 291, 141/292, 296, 346, 347, 348, 349, 350, 363, 368, 382, 383, 384; 222/402.16; 285/32, 302, 206, 208, 319

[56] References Cited

U.S. PATENT DOCUMENTS

| 2,708,347 | 5/1955 | Cameron | 141/3 X |
| 2,860,820 | 11/1958 | Falligant | 285/319 X |
| 3,620,266 | 11/1971 | Ryder | 141/20 |
| 3,712,646 | 1/1973 | Bergougnoux | 285/319 X |

Primary Examiner—Frederick R. Schmidt
Attorney, Agent, or Firm—Dowell and Dowell

[57] ABSTRACT

A system of fastening an apparatus on a cartridge of fluid under pressure provided with a dispensing and/or filling valve and an annular bead surrounding the said valve, this fastening system, which comprises:

a central core for fastening the said apparatus, comprising fluid dispensing means intended to cooperate with the valve of the said cartridge;

a tubular sleeve surrounding the central core, movable axially relative to the latter, and provided with radial claws adapted to clip onto the bead of the cartridge;

an annular stop serving as support against the bead of the cartridge;

means of axially displacing the tubular sleeve, is characterized in that the annular stop is separate from the tubular sleeve and axially fixed relative to the central core and has an operative face against which the annular bead of the cartridge comes to bear when the said sleeve is displaced axially in the direction of the apparatus.

11 Claims, 7 Drawing Figures

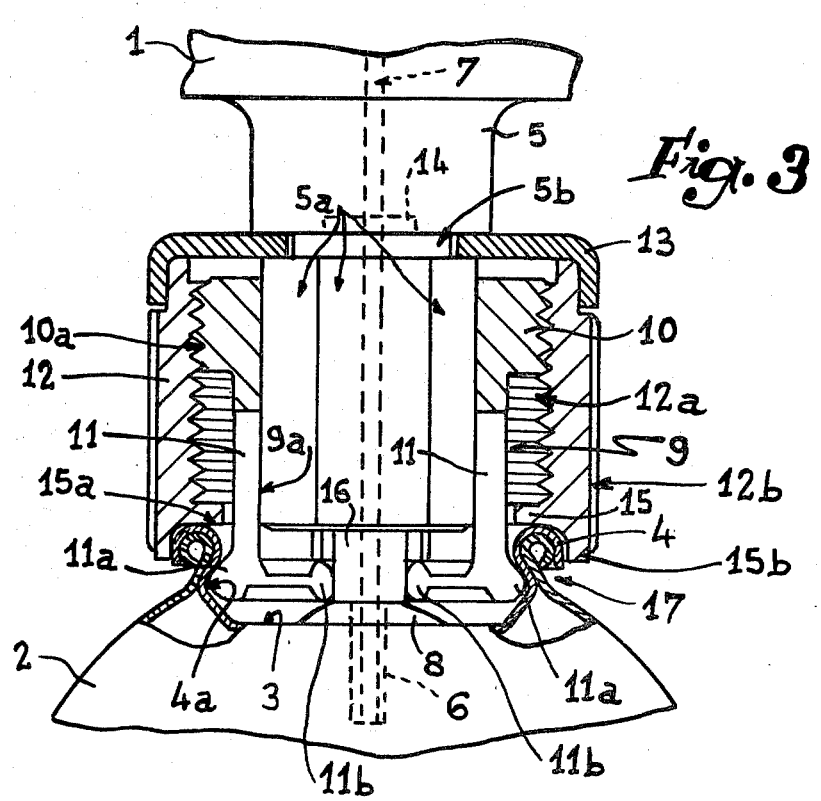
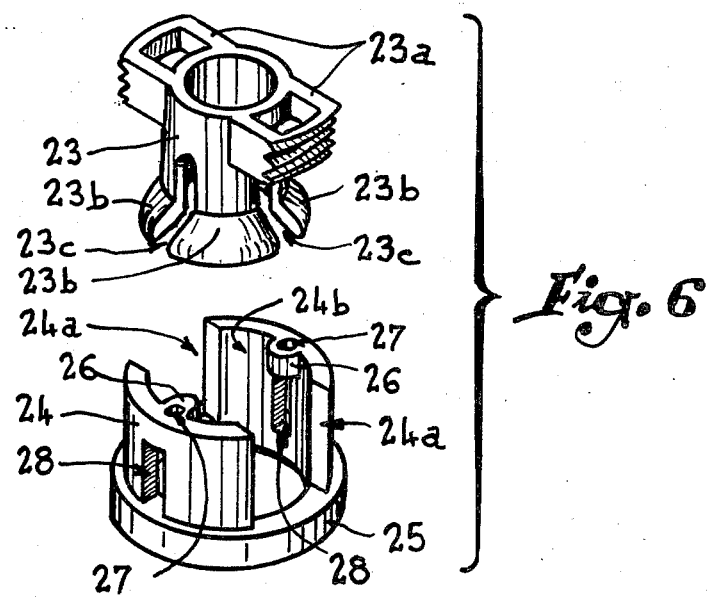

SYSTEM OF FASTENING AN APPARATUS ON A CARTRIDGE OF FLUID UNDER PRESSURE

The present invention relates to an improved system of fastening an apparatus adapted to utilise a fluid under pressure in the liquid and/or gaseous phase contained in a cartridge having an annular bead with a rolled edge which surrounds its extraction and/or filling valve.

Systems of the type in question are known which comprise a central core for fastening the utilisation apparatus, comprising means of dispensing fluid under pressure and intended to cooperate with the valve of the cartridge used; a tubular sleeve surrounds the central core and is axially movable relative to the latter, this sleeve being provided with radial claws adapted to clip onto the bead of the cartridge and having an annular stop bearing against the annular bead of the cartridge when the aforesaid sleeve is displaced axially oppositely to the utilisation apparatus; these systems also have means for the axial displacement of the tubular sleeve.

The fastening of such systems is elastic because the bead of the cartridge cannot be gripped between the front support stop and the claws owing to the fact that these two elements form part of one and the same member, that is to say the tubular sleeve. The stop serves in fact only as a stop preventing further driving-in, fastening being effected only by the claws.

The improvements forming the object of the present invention seek to obviate these disadvantages and to enable an apparatus to be secured rigidly on a cartridge, the bead of the latter being gripped between a fixed support surface and movable claws.

For this purpose the annular stop is separate from the tubular sleeve and is axially fixed in relation to the central core; it comprises an operative face against which the annular bead of the cartridge bears when the said sleeve is displaced axially in the direction of the apparatus.

The accompanying drawing, given by way of example, will enable the invention, the characteristics which it possesses, and the advantages which it can afford to be better understood.

FIG. 3 is a similar view to FIG. 1, but shows the fastening system associated with a gas cartridge;

FIG. 6 is an exploded view of the two main elements of the modified embodiment shown in FIG. 5;

Figure 1:
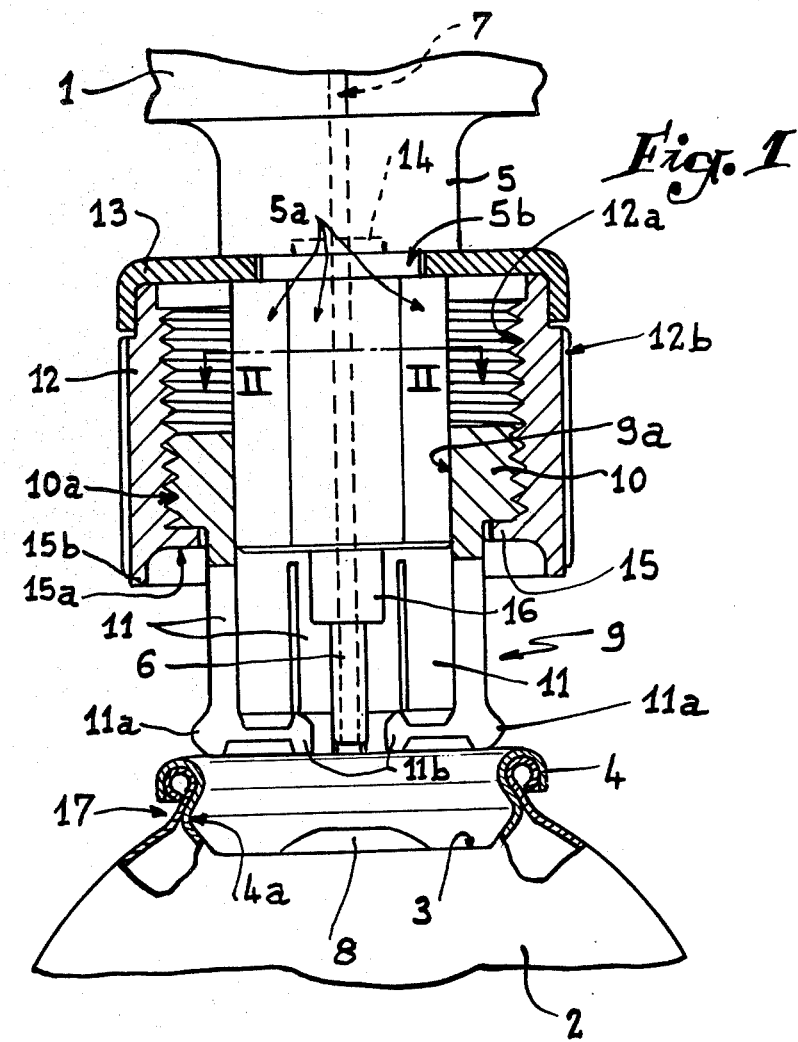
FIG. 1 is a longitudinal section of a fastening system constructed in accordance with the invention, this system being shown above a cartridge containing liquefied gas under pressure.

The fastening system according to the invention is intended for mounting a gas apparatus 1 on a cartridge 2 the top of which is in the form of a cup 3 having a rolled edge or annular bead 4. An arrangement of this kind is found for example in cartridges used for packing products in aerosol form.

The system according to the invention comprises in turn a central core 5 which is fastened to the apparatus 1 and the bottom end of which has customary means (for example a tube) for dispensing the gas contained in the cartridge, in such a manner that the gas can flow in the direction of the apparatus 1 through an axial passage 7 from a central valve 8 fastened to the said cartridge, or more precisely to the cup 3.

Figure 2:
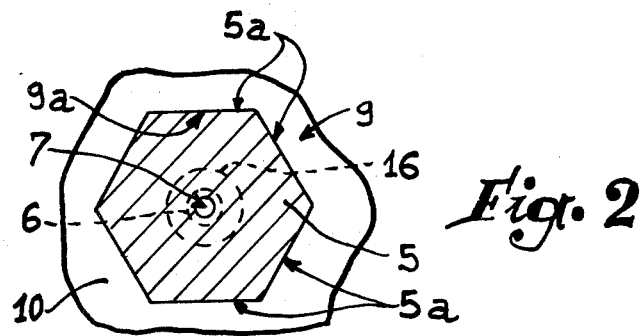
FIG. 2 is a view thereof on the line II—II in FIG. 1.

A tubular sleeve 9 of elastic material surrounds the core, in relation to which it can slide longitudinally and axially. Its bore 9a is preferably polygonal in shape (FIG. 2), so that its side faces cooperate with corresponding flats provided on the periphery 5a of the core 5. Thus the sleeve 9 is angularly fixed in relation to the core 5. At the top it is provided with a head 10 the periphery of which has a male screwthread 10a. At the bottom it is also provided with a certain number of radial claws 11 spaced apart from one another and adapted to clip onto the bead 4, each of these claws having at its bottom end an outwardly directed projection 11a and also an inwardly directed radial heel 11b the length of which will be defined later on.

The screwthread 10a of the head 10 of the sleeve 9 cooperates with the female screwthread 12a of an external sleeve 12 constituting a nut. The sleeve 12 has a periphery 12b which is grooved or has any other shape facilitating its gripping. Its top end is fastened by any suitable means (not shown) to a flange 13 preferably formed by two half-washers engaged in a groove 5b in the central core 5. The two half-washers are fastened by lugs 14 screwed respectively into each of them. The outer sleeve can thus turn freely relative to the core 5, but cannot be displaced axially in relation to it.

It will be noted that the bottom of the outer sleeve 12 forms a circular collar 15 extending inwards below the annular portion of the head 10 of the sleeve 9. This collar or stop comprises on the one hand an operative bottom face or stop 15a intended to constitute the previously mentioned annular support surface separate from the sleeve 9 and directed perpendicularly in relation to the geometrical axis of the fastening system, and on the other hand a circular rim 15b perpendicular to the face 15a.

The mode of operation is clear from the explanations given above.

For the purpose of fastening the apparatus 1 on the cartridge 2, which is disposed vertically on a horizontal plane, it is sufficient to grip the said apparatus in one hand and to lower vertically the apparatus and fastening system in such a manner that the claws 11 face the cup 3. The apparatus still being held in the same hand, the outer sleeve 12 is turned by the other hand in a direction such that the sleeve 9 is displaced axially in the direction of the apparatus and that the claws 11 pass out of the said sleeve (FIG. 1). When the claws 11 have passed out completely, they are clipped onto the cup 3 of the cartridge 2 by pushing the apparatus 1; in this way, through radial elasticity directed towards the centre of the claws 11 the projections 11a are received in the internal recess 4a of the rolled edge 4. The outer sleeve 12 is then turned in the opposite direction to that which causes the claws 11 to move out, so that these claws return inside the sleeve and bring the rolled edge 4 (and therefore the cartridge 2) against the collar 15, or more precisely against the face 15a. When this stop bears against the top of the bead 4 the sleeve is energetically screwed so that the said bead is gripped between the projections 11a of the claws 11 and the face 15a (FIG. 3). It will be noted that in this position the inner end of the heel 11b cooperates with a cylindrical part 16 extending the central core 5, so that the claws 11 cannot close up under the action of the stop 15a. This arrangement also makes it possible to prevent in a reliable manner the mounting of a fastening system according to the invention on an ordinary aerosol cartridge having a central boss surrounding the dispensing or filling valve.

All in all, according to the invention rigid locking of the apparatus 1 on the cartridge 2 is achieved, thus permitting better stability of the whole arrangement while increasing tightness at the valve 8 owing to the fact that the dispensing means 6 remain completely immobile in the said valve.

As a modification, the support stop of the rolled edge 4 can be made in the form of outwardly directed radial arms fastened to the central core 5 and passing between the claws 11.

According to another modified embodiment of the invention, instead of cooperating with the internal recess 4a of the rolled edge 4 the claws could cooperate with the external depression 17 formed between the rolled edge and the exterior of the descending wall of the cartridge 2.

Figure 4:
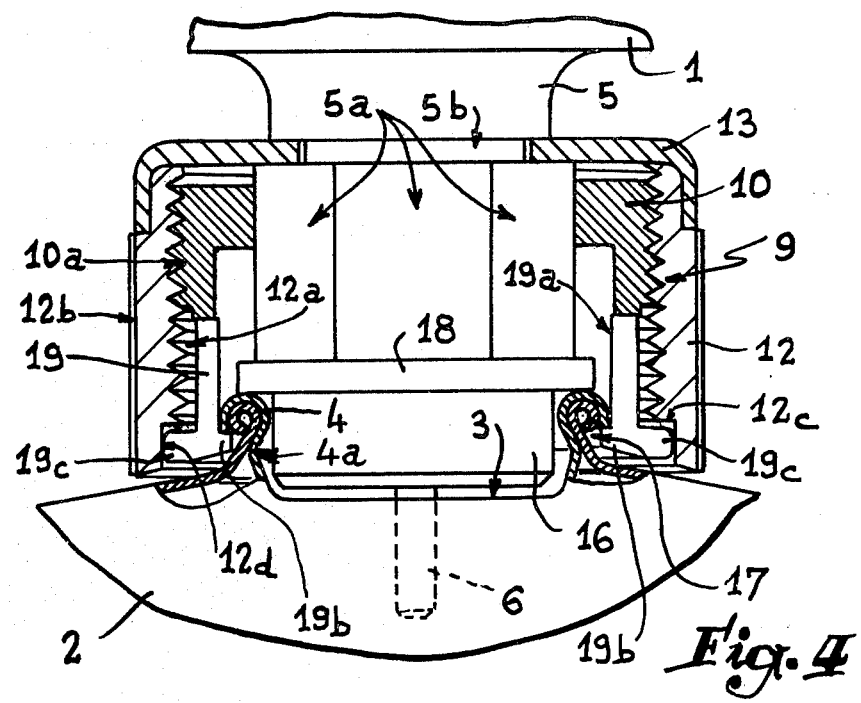
FIGS. 4 and 5 are similar views to that in FIG. 3 but show respectively two modified embodiments of the present invention.

For this purpose, as shown in FIG. 4, the annular stop 15a is here replaced by a peripheral collar 18 fastened to the central core 5. The head 10 is extended downwards by longitudinal fingers 19 whose inner face 19a is inscribed in a cylinder of a diameter approximately equal to that of the rolled edge 4 of the cartridge 2. The ends of each finger 19 are provided with claws, each of which comprises a protuberance 19b directed towards the centre and a projection 19c directed towards the outside.

The bottom end of the outer sleeve 12 is provided with a recess 12c; after the apparatus has been fitted on the cartridge the side face 12d of the said recess bears against the end of the aforesaid projections 19c for the purpose of holding them radially, while the protuberances 19b remain in the depression 17.

Figure 5:
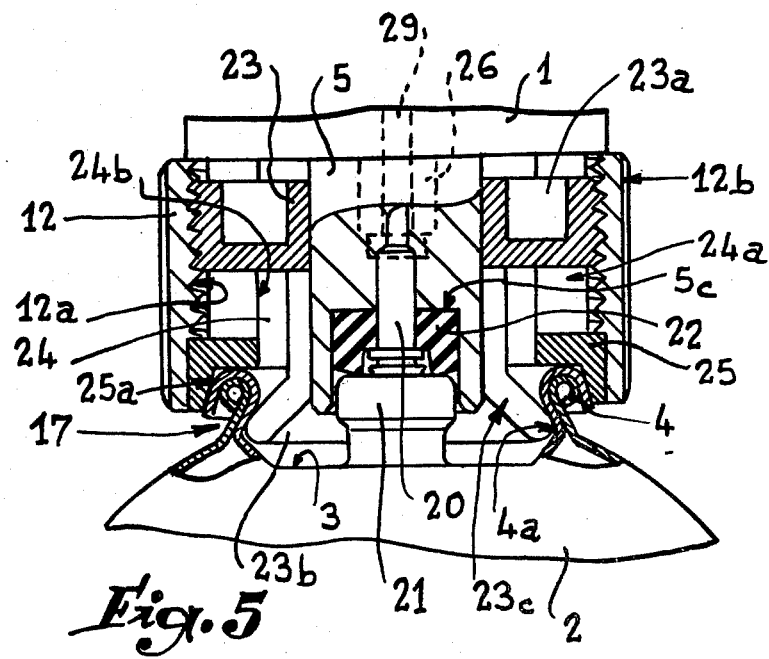

According to yet another modified embodiment, which is illustrated in FIGS. 5 and 6, provision is made for fitting the apparatus 1 on a cartridge 2 of the aerosol type, which thus has a dispensing valve 20 situated at the centre of a boss 21 disposed axially in the cup 3. The central core 5 has an end recess 5c in which is engaged a seal 22 preventing any loss of gas at that point. The outer sleeve 12 is provided once again, this sleeve forming a nut and being fastened longitudinally to the core 5 while being free to turn in relation to it. The screwhead of this outer sleeve cooperates with the threaded ends of the diametrical arm 23a of a sleeve 23 provided with claws (FIG. 6). The sleeve 23 is guided axially by cooperation of the arms 23a with the radial slot 24a in a tubular ring 24 whose recess 25a in the base 25 rests against the annular bead 4 both by its annular face and by its side face. At the centre of each of the two partitions of the ring 24, which are formed by the slot 24a, provision is made to provide a boss 26 pierced by a hole 27. Each partition has an opening 28 situated below the corresponding boss 26. The sleeve 23 is in addition provided with four claws 23b separated by slots 23c the width of which is greater than that of each boss of the ring 24. The outside diameter of the claws is greater than that of the bore 24b of the ring 24, so that the claws are retracted inwards when the sleeve passes through the ring, and that after passing out of the said bore they have a diameter in the free state which is sufficient to be able to engage elastically in the internal recess 4a of the annular bead 4 when the recess 25a bears against the latter. Obviously, the ring 24 is previously connected to the apparatus 1 by means of screws 29 passing through holes 27. All that is then required is to turn the outer sleeve 12 so as to apply the recess 25a firmly against the bead 4 in order to fasten the apparatus 1 in a stable manner in relation to the said bead. At the same time the valve 20 is opened by the action of the core 5, thus enabling the apparatus 1 to be fed through a suitable channel (not shown).

Figure 7:
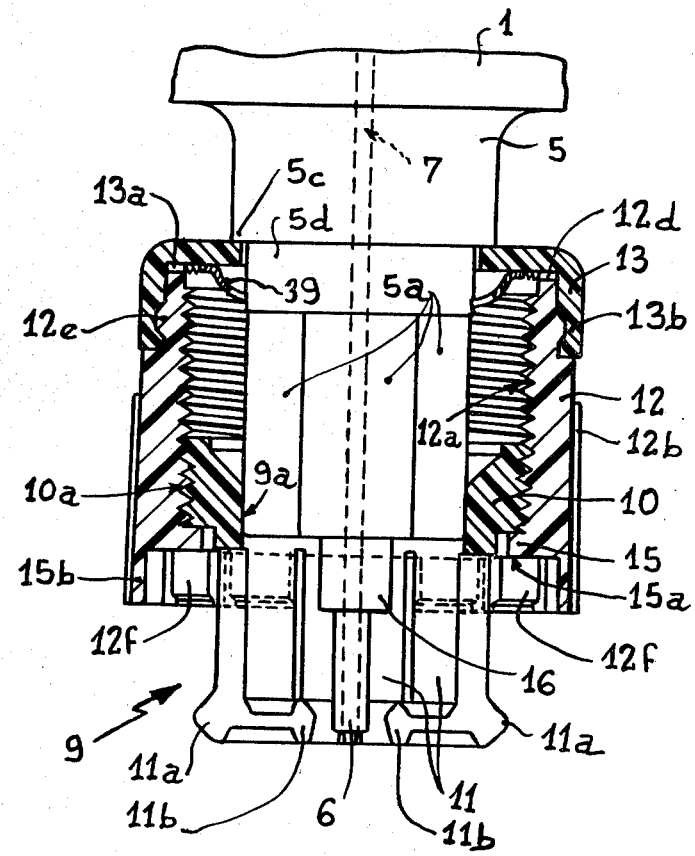
FIG. 7 is a similar view to FIG. 1 but omitting the cartridge 2 and showing a preferred embodiment of the invention.

FIG. 7 illustrates the preferred form of construction of the outer sleeve 12 and flange 13, produced by injection moulding of a suitable plastics material. The top of the outer sleeve forms a crown 12d the top of which is toothed in order to enable its teeth to cooperate with at least one projection 13a carried by the inner face of the bottom of the flange 13. The periphery of the outer sleeve 12 is also provided with a ring 12e which engages in a groove 13b provided on the inner face of the skirt of the flange 13. In this manner this engagement ensures cooperation between the projection or projections 13a and the teeth of the crown 12d of the outer sleeve 12, in order to enable these two parts to be angularly and axially secured.

The flange 13 is made in one piece and it engages around flats 5a of the central core 5 so as to rest against a shoulder 5c on the latter. Between this shoulder and the flats 5a the core 5 has a cylindrical bearing surface 5d whose diameter is at least equal to the diameter over corners of the portion having flat sides, so that it can cooperate with an elastic washer 39 known per se which holds the flange 13 against the shoulder 5c, while permitting its rotation.

It will be noted that a continuous or discontinuous belt 12f is disposed in the lower part of the sleeve 12, concentrically to its outer face. This belt 12f cooperates with the rolled edge 4 of the cartridge 2 so as to clip under its peripheral depression 17 in such a manner as to form a brake preventing any undesirable relative displacement of the sleeve in relation to the core through the action of vibrations, produced for example by transport over long distances. The elastic belt is preferably discontinuous. Its presence does not in any way hinder the operation of dismantling the apparatus from the cartridge.

It should in addition be understood that the above description has been given only by way of example and that it does not in any way limit the field of the invention, which will not be departed from by replacing the details of construction described by any other equivalent details.

We claim:

1. A coupling system for fastening and coupling an apparatus on a cartridge of fluid under pressure, said cartridge having a central valve and having an annular bead surrounding said valve, said coupling system comprising:

a central core member carrying axially disposed fluid connecting means operative for fluid-tight coupling with the valve of said cartridge;

a tubular sleeve member having a first portion surrounding said core member and being non-rotatively but axially slidably supported thereon, the tubular sleeve member having a second portion having radially deformable claws having projections at their lower ends shaped to latch beneath the bead of the cartridge when urged theretoward;

separate displacing means mounted on said members, and engaging the core member and the sleeve member and operative when said projections are latched to displace the core member axially with respect to the sleeve member toward the cartridge for fluid-tight coupling of the connecting means with the valve; and stop means axially fixed with respect to the core member and extending radially thereof, and located to abut and support the bead when said projections are latched and said core member is displaced toward the cartridge.

2. A coupling system according to claim 1, wherein said first portion of said tubular sleeve member has a head on which the deformable claws are supported, said head being externally threaded; and said separate displacing means further comprising an external sleeve which is axially fixed with respect to the core member and rotatively mounted thereon, the external sleeve being internally threaded and engaged with said threaded head.

3. A coupling system according to claim 2, wherein said stop means is fixed to said external sleeve, and is located at the bottom thereof.

4. A coupling system according to claim 2, wherein said central core has a cylindrical bearing surface, and a shoulder above the latter and wherein said separate displacing means further comprises:

an annular flange rotatably mounted on the cylindrical surface of the central core located axially against the shoulder of said core, said annular flange extending radially from said core; and an annular collar fixed to said annular flange and extending concentrically with said central core and comprising said external sleeve.

5. A coupling system according to claim 4, wherein:

the top of the annular collar has a toothed crown, and the side of said annular collar has a ring; and the inner face of the annular flange has projecting means engaging said toothed crown, said annular flange having a skirt including interlocking means engaging said ring.

6. A coupling system according to claim 3, wherein:

an annular inserted part is disposed coaxially between said external sleeve and said tubular sleeve, and is fastened to said central core, said inserted part comprising at its bottom said stop means, and said inserted part having at least two open slots extending laterally opposite to one another; and said head of the tubular sleeve has at least two externally threaded arms engaged respectively in said two slots and extending therethrough and cooperating with the internal threads of the external sleeve.

7. A coupling system according to claim 1, wherein said stop means comprises an annular radially extending collar, disposed to continuously engage the upper surface of the bead of the cartridge.

8. A coupling system according to claim 7, wherein said stop means further comprises an annular rim extending from and below said annular collar and concentrically of said core, said annular rim being adapted to fully engage the outer periphery of the bead of the cartridge.

9. A coupling system according to claim 8, wherein the bottom edge of said annular rim is adapted to extend below and outside of the annular bead of the cartridge, within an external recess of said bead.

10. A coupling system according to 1, wherein said stop means is integral with said central core and comprises a peripheral collar located at the bottom of said core.

11. A coupling system according to claim 1, wherein said radial claws are shaped to clip to the outside of the annular bead within an external recess of said bead.

* * * * *